(12) United States Patent
Harmon et al.

(10) Patent No.: US 11,766,939 B1
(45) Date of Patent: Sep. 26, 2023

(54) ARTICULATED DISPLAY FOR A VEHICLE

(71) Applicant: Ford Global Technologies, LLC, Dearborn, MI (US)

(72) Inventors: Michael John Harmon, Northville, MI (US); Hussain Z. Tajmahal, Detroit, MI (US); Scott Culver Anderson, Commerce Township, MI (US); Leyna Hirsch, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/881,825

(22) Filed: Aug. 5, 2022

(51) Int. Cl.
*B60K 37/04* (2006.01)
*F16M 11/14* (2006.01)

(52) U.S. Cl.
CPC ............. *B60K 37/04* (2013.01); *F16M 11/14* (2013.01); *B60K 2370/67* (2019.05); *B60K 2370/744* (2019.05)

(58) Field of Classification Search
CPC .... F16M 11/14; F16M 11/2078; B60K 37/04; B60K 2370/67; B60K 2370/744; F16C 11/06; F16C 11/0614; F16C 11/106
USPC ................. 248/27.1, 633, 481, 181.1–181.2, 248/288.31–288.51
See application file for complete search history.

(56) References Cited

U.S. PATENT DOCUMENTS

| | | | |
|---|---|---|---|
| 2,859,059 A * | 11/1958 | De Loach | F16C 11/106 248/181.2 |
| 5,941,488 A | 8/1999 | Rosen | |
| 6,585,201 B1 * | 7/2003 | Reed | F16M 13/02 248/917 |
| 8,132,291 B2 * | 3/2012 | Tsai | F16C 11/106 16/224 |
| 8,231,081 B2 | 7/2012 | Fortes et al. | |
| 10,038,829 B2 * | 7/2018 | Gilbert | H04N 23/661 |
| 10,378,579 B2 * | 8/2019 | Grziwok | F16M 11/2078 |
| 2005/0061225 A1 * | 3/2005 | Metz | B63B 21/00 114/230.16 |
| 2007/0152116 A1 * | 7/2007 | Madsen | F16M 11/14 248/181.1 |
| 2008/0105289 A1 * | 5/2008 | Ma | A45B 17/00 135/20.1 |
| 2010/0236020 A1 * | 9/2010 | Tsai | F16C 11/0604 16/224 |
| 2010/0301080 A1 | 12/2010 | Heckman | |

(Continued)

FOREIGN PATENT DOCUMENTS

WO 2020035192 A1 2/2020

*Primary Examiner* — Christopher Garft
(74) *Attorney, Agent, or Firm* — Vichit Chea; Price Heneveld LLP

(57) ABSTRACT

An articulated display for a vehicle, the articulated display comprises a display housing and a ball joint outwardly extending from a backside of the display housing, wherein the ball joint defines a first locking aperture. The articulated display also comprises a compression module, wherein the compression module defines a second locking aperture and a mounting aperture, and wherein the ball joint is disposed within the mounting aperture. The articulated display further comprises a pedestal sleeve housing, wherein the compression module slidably couples with the pedestal sleeve housing. The articulated display even further comprises a locking pin coupled with the pedestal sleeve housing.

13 Claims, 5 Drawing Sheets

(56) References Cited

U.S. PATENT DOCUMENTS

| | | | | |
|---|---|---|---|---|
| 2015/0168815 A1* | 6/2015 | Chen | ................... | F16M 13/027 |
| | | | | 396/427 |
| 2020/0003359 A1* | 1/2020 | Vlaar | ................. | F16M 11/2014 |
| 2020/0309312 A1* | 10/2020 | Ye | ......................... | F16M 11/14 |

* cited by examiner

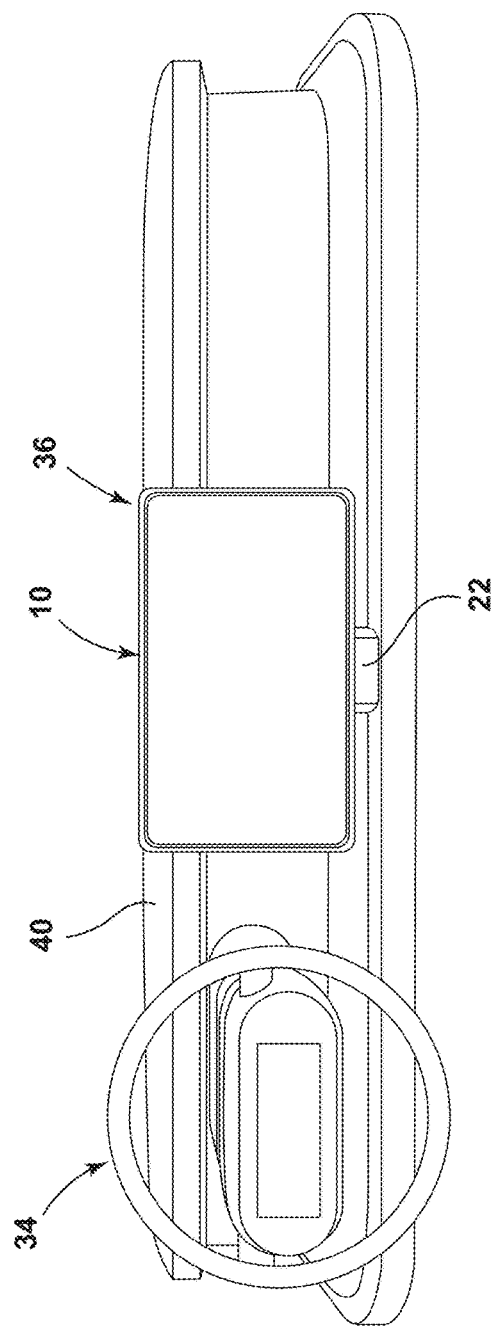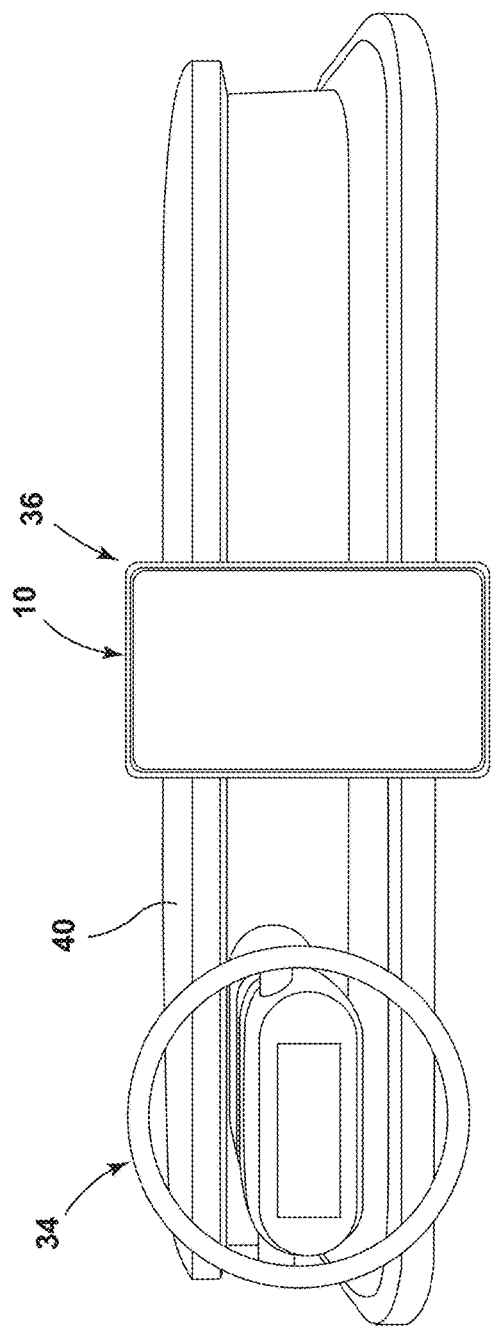
FIG. 2A
FIG. 2B

ARTICULATED DISPLAY FOR A VEHICLE

FIELD OF THE DISCLOSURE

The present disclosure generally relates to an articulated display. More specifically, the present disclosure relates to an articulated display for a vehicle.

BACKGROUND OF THE DISCLOSURE

Many vehicles typically include a display. The display may be for assisting operation of the vehicle or for entertainment.

SUMMARY OF THE DISCLOSURE

According to a first aspect of the present disclosure, an articulated display for a vehicle, the articulated display comprises a display housing and a ball joint outwardly extending from a backside of the display housing, wherein the ball joint defines a first locking aperture. The articulated display also comprises a compression module, wherein the compression module defines a second locking aperture and a mounting aperture, and wherein the ball joint is disposed within the mounting aperture. The articulated display further comprises a pedestal sleeve housing, wherein the compression module slidably couples with the pedestal sleeve housing. The articulated display even further comprises a locking pin coupled with the pedestal sleeve housing.

Embodiments of the first aspect of the present disclosure can include any one or a combination of the following features:
- the compression module comprises an upper compression module; and a lower compression module, wherein the upper compression module couples with the lower compression module via a plurality of fasteners, and wherein the upper compression module and the lower compression module each apply a frictional force to the ball joint;
- at least one adjuster bolt adjusts the frictional force applied to the ball joint by each of the upper compression module and the lower compression module;
- the locking pin operates between an engaged position, an engaged position, wherein the locking pin extends through the first and second locking apertures and a disengaged position, wherein the locking pin holds the display housing in position relative to the locking pin while the locking pin is in the engaged position, and further wherein the articulated display tilts laterally, tilts vertically, rotates about the ball joint, and translates vertically while the locking pin is in the disengaged position;
- the pedestal sleeve housing at least partially circumscribes the compression module, wherein the compression module defines at least one groove, wherein the pedestal sleeve housing comprises at least one protruding wing, and further wherein the at least one groove of the compression module receives the at least one protruding wing of the pedestal sleeve housing;
- the at least one protruding wing of the pedestal sleeve housing applies a frictional force to the at least one groove of compression module;
- the ball joint defines a first chamfered rim around the first locking aperture, and wherein the compression module defines a second chamfered rim around the second locking aperture;
- the ball joint further defines a wiring passage;
- the pedestal sleeve housing at least partially circumscribes the compression module; and
- the ball joint comprises: a neck portion, wherein the neck portion extends through the mounting aperture of the compression module; and a ball portion, wherein the ball portion is encapsulated within the compression module.

According to a second aspect of the present disclosure, an articulated display for a vehicle, the articulated display comprises a display housing and a ball joint outwardly extending from a backside of the display housing, wherein the ball joint defines a first locking aperture. The articulated display also comprises a compression module, wherein the compression module defines a mounting aperture and a second locking aperture, and wherein the compression module comprises an upper compression module, wherein the upper compression module defines a plurality of securing apertures. The compression module further comprises a plurality of fasteners received by the plurality of securing apertures, respectively and a lower compression module, wherein the ball joint is held in the mounting aperture, and wherein the upper compression module couples with the lower compression module via the plurality of fasteners to define a friction fit with the ball joint. The articulated display further comprises a pedestal sleeve housing, wherein the pedestal sleeve housing at least partially circumscribes the compression module, and wherein the compression module is slidably coupled with the pedestal sleeve housing. The articulated display further comprises a locking pin operable between an engaged position and a disengaged position, wherein the locking pin holds the display housing in position relative to the locking pin while the locking pin is in the engaged position and extending through the first and second locking apertures, and further wherein the articulated display tilts laterally, tilts vertically, rotates about the ball joint, and translates vertically while the locking pin is in the disengaged position.

Embodiments of the second aspect of the present disclosure can include any one or a combination of the following features:
- the ball joint is encapsulated within the compression module;
- the compression module comprises at least one protruding wing, wherein the pedestal sleeve housing defines at least one groove, and further wherein the at least one groove of the pedestal sleeve housing receives the at least one protruding wing of the compression module;
- the at least one protruding wing of the compression module applies a frictional force to the at least one groove of the pedestal sleeve housing; and
- the ball joint defines a first chamfered rim around the first locking aperture, and wherein the compression module defines a second chamfered rim around the second locking aperture.

According to a third aspect of the present disclosure, an articulated display for a vehicle comprises a display housing and a ball joint outwardly extending from a backside of the display housing, wherein the ball joint defines a first locking aperture. The articulated display also comprises an upper compression module that defines a plurality of fastener apertures and a lower compression module operably coupled to the upper compression module, wherein the upper compression module and the lower compression module together define a second locking aperture and a mounting aperture, wherein the ball joint is held in the mounting aperture, and wherein the upper compression module couples with the lower compression module to define a friction fit with the ball joint. The articulated display further comprises a pedestal sleeve slidably coupled with the lower compression module and a locking pin coupled with the pedestal sleeve housing.

Embodiments of the third aspect of the present disclosure can include any one or a combination of the following features:

- the ball joint is encapsulated within the compression module;
- the ball joint comprises a neck portion, wherein the neck portion extends through the mounting aperture of the upper compression module and the lower compression module; and a ball portion, wherein the ball portion is encapsulated between the upper compression module and the lower compression module;
- the locking pin operates between an engaged position and a disengaged position, wherein the locking pin holds the display housing in position relative to the locking pin while the locking pin is in the engaged position and extending through the first and second locking apertures, and further wherein the articulated display tilts laterally, tilts vertically, rotates about the ball joint, and translates vertically while the locking pin is in the disengaged position;
- at least one adjuster bolt adjusts the frictional force applied to the ball joint by each of the upper compression module and the lower compression module; and
- the lower compression module comprises at least one protruding wing, wherein the pedestal sleeve housing defines at least one groove, and further wherein the at least one groove of the pedestal sleeve housing receives the at least one protruding wing of the lower compression module.

These and other features, advantages, and objects of the present invention will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 2A is a front perspective view of a dash of the vehicle including the articulated display in a landscape view orientation, according to the present disclosure;

FIG. 2B is a front perspective view of the dash of the vehicle including the articulated display in a portrait view orientation, according to the present disclosure;

DETAILED DESCRIPTION OF PREFERRED EMBODIMENTS

Figure 1:
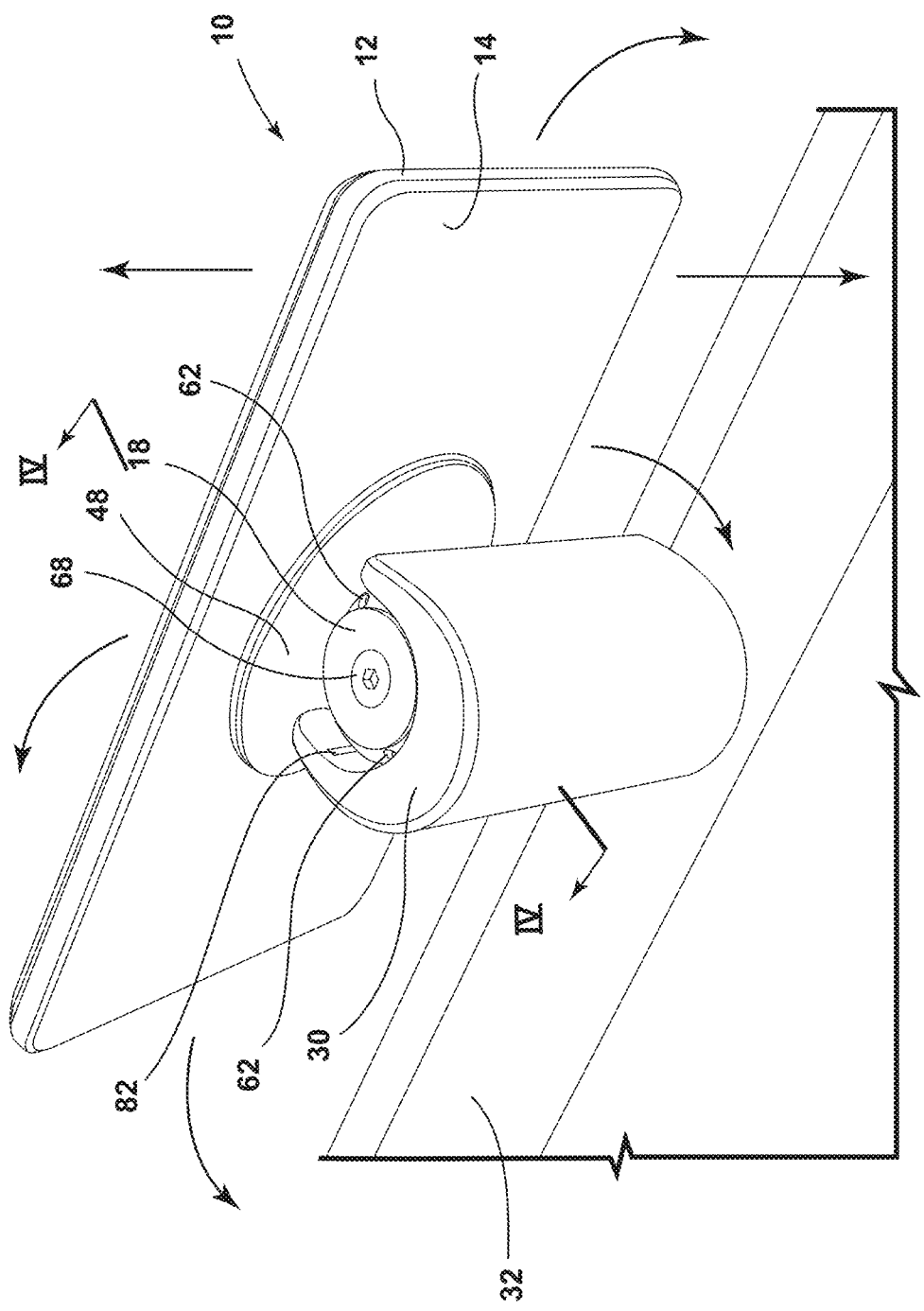
FIG. 1 is rear top perspective view of an articulated display mounted on a portion of a vehicle, according to the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an articulated display for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5, reference numeral 10 generally designates an articulated display 10 comprising a display housing 12. The display housing 12 includes a rear surface 14 on the backside of the display housing 12. A ball joint 16 outwardly extends from the backside of the display housing 12. A compression module 18 comprises an upper compression module 20 and a lower compression module 22. The compression module 18 defines a mounting aperture 24. The mounting aperture 24 may be entirely defined by the upper compression module 20, entirely defined by the lower compression module 22, or partially defined by the upper compression module 20 and partially defined by the lower compression module 22. The compression module 18 defines a second locking aperture 26. The second locking aperture 26 may be entirely defined by the upper compression module 20, entirely defined by the lower compression module 22, or partially defined by the upper compression module 20 and partially defined by the lower compression module 22. The compression module 18 defines a ball chamber 28. In one embodiment, the upper compression module 20 partially defines the ball chamber 28, and the lower compression module 22 also partially defines the ball chamber 28. The ball joint 16 extends through the mounting aperture 24, and frictionally interacts with the compression module 18 within the ball chamber 28. A pedestal sleeve housing 30 at least partially circumscribes the compression module 18. The pedestal sleeve housing 30 couples with an interior 32 of the vehicle 34. In the example shown, the pedestal sleeve housing 30 couples with a dash 40 of the vehicle 34. The compression module 18 slidably couples with the pedestal sleeve housing 30. The articulated display 10 is configured to tilt vehicle upward, tilt vehicle downward, tilt in vehicle lateral directions, rotate between a landscape view orientation 36 and a portrait view orientation 38, and slide vertically.

Figure 3:
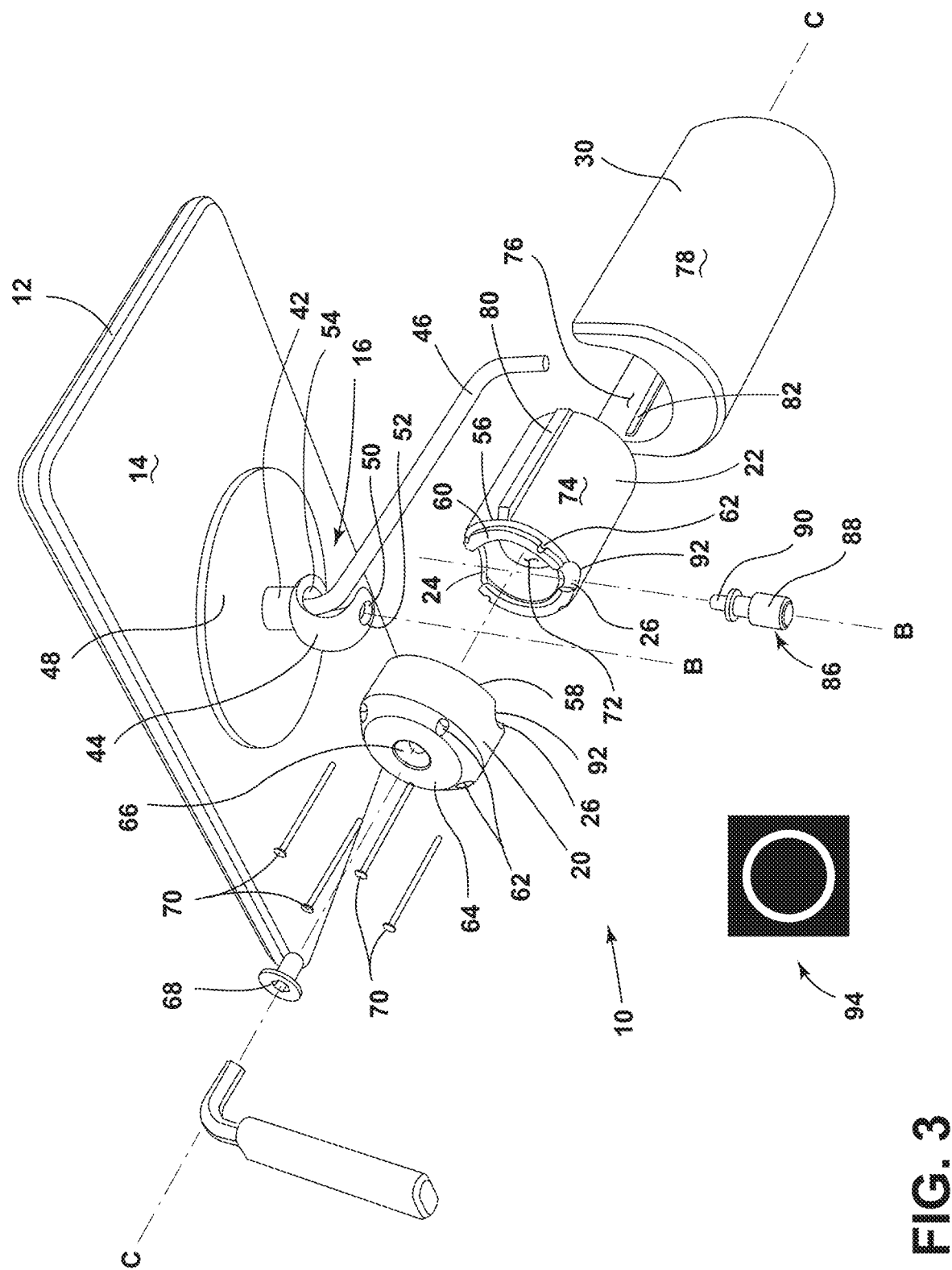
FIG. 3 is an exploded view of the articulated display, according to the present disclosure.
Figure 4:
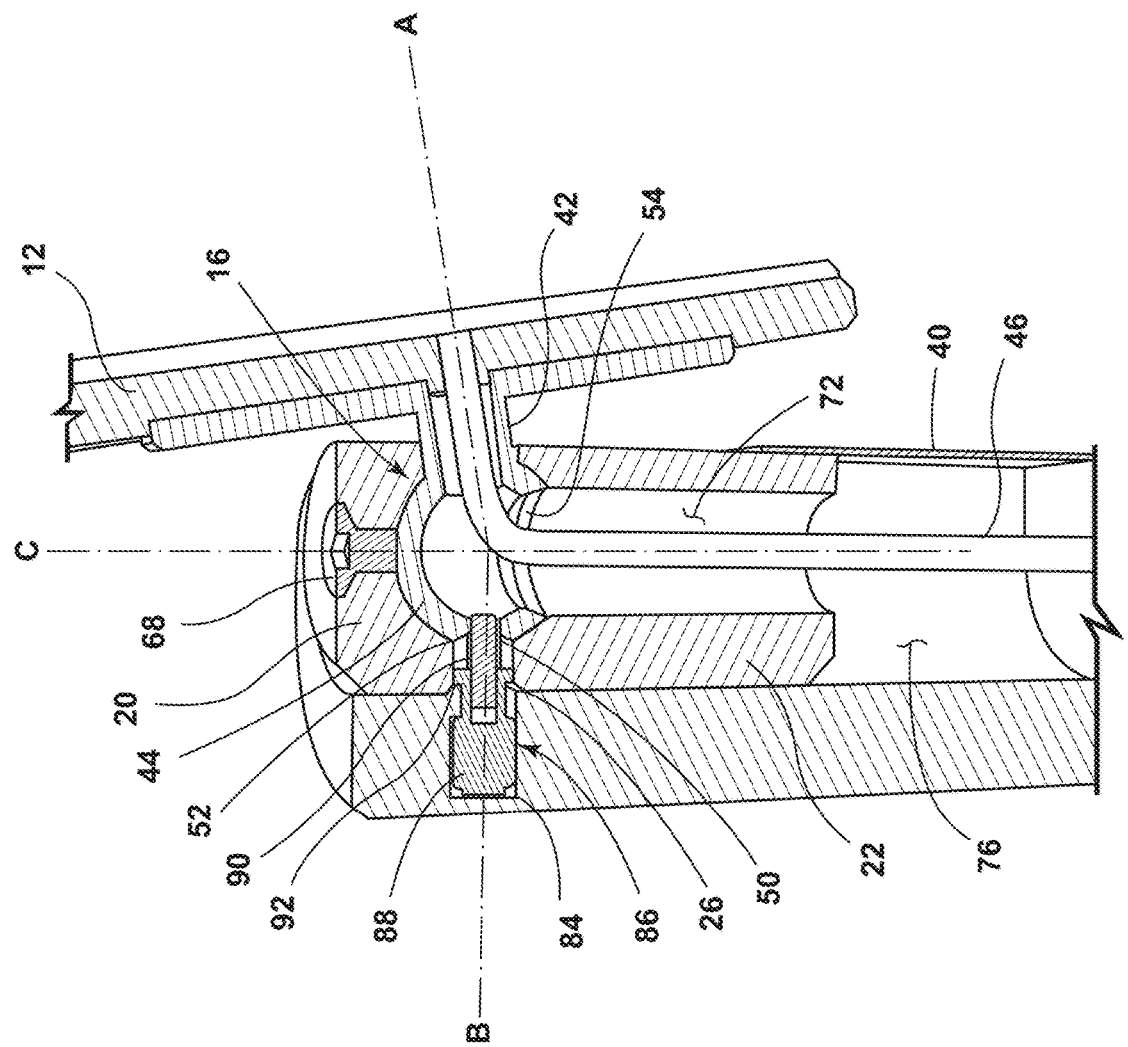
FIG. 4 is a cross-sectional view, taken through line IV-IV of FIG. 1 showing the articulated display with a locking pin in an engaged position, according to the present disclosure.
Figure 5:
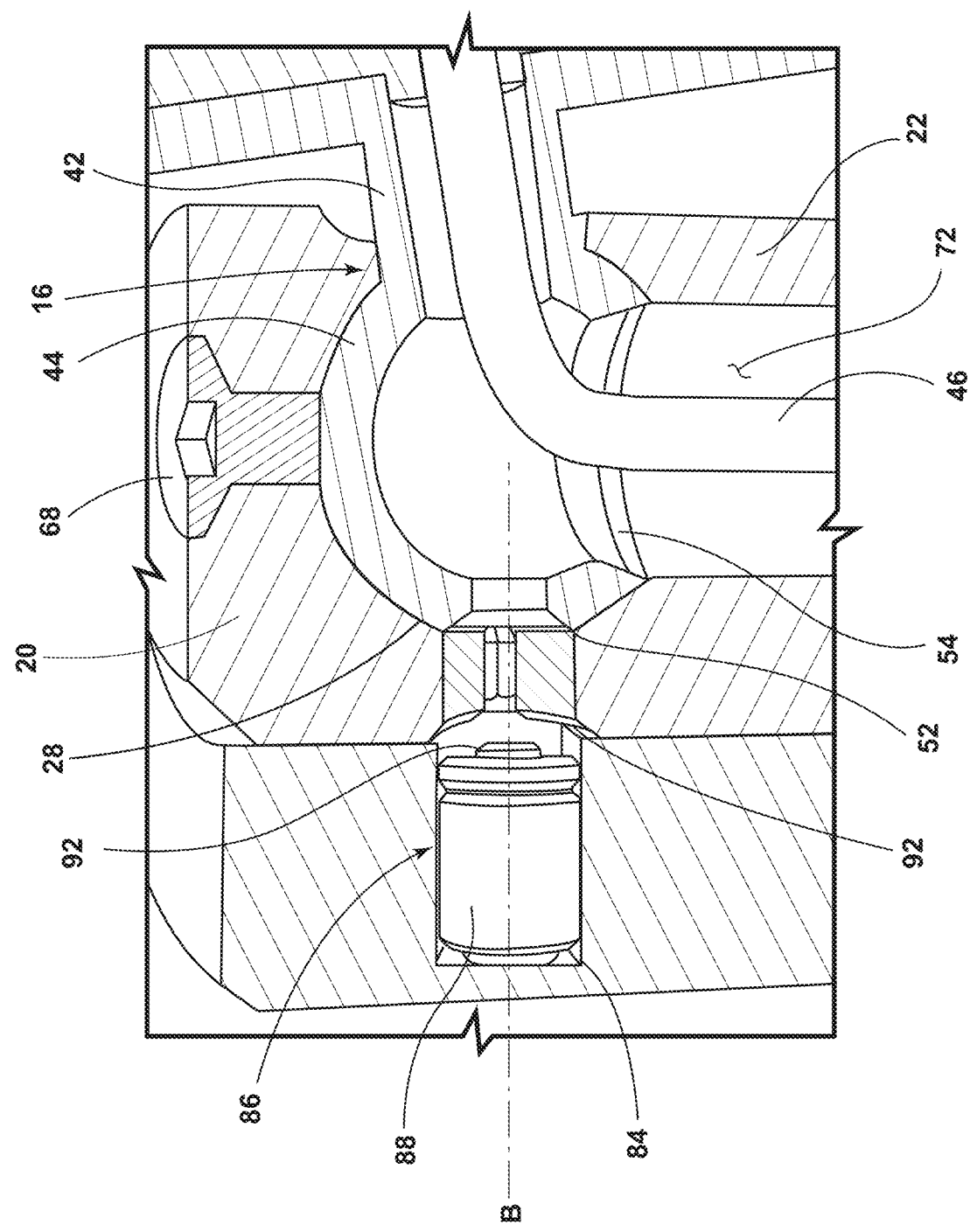
FIG. 5 is an enlarged cross-sectional view of the articulated display with the locking pin in a disengaged position, according to the present disclosure.

Referring to FIGS. 3-5, the ball joint 16 comprises a neck portion 42 and a ball portion 44. The articulated display 10 has a front surface on an opposite side of the rear surface 14 that presents a display surface for displaying information such as alphanumeric texts, symbols, images, and other data. The articulated display 10 may include any electronic display screen such as a light-emitting diode (LED) screen, for example, and may be used for navigation, infotainment, entertainment, et cetera. The ball portion 44 and the neck portion 42 may be hollow to accommodate a wire 46. The ball joint 16 may also comprise a mounting plate 48. The ball joint 16 may couple directly with the rear surface 14 of the display housing 12. Additionally, or alternatively, the mounting plate 48 of the ball joint 16 may operably couple with the rear surface 14 of the display housing 12. The ball joint 16 defines a first locking aperture 50. The ball joint 16 may define a first chamfered rim 52 around the first locking aperture 50. The ball joint 16 may define a wiring passage 54. The wire 46 may outwardly extend from the articulated display 10 through the wiring passage 54 of the ball joint 16. The ball joint 16 defines the wiring passage 54 such that the wire 46 passes through the wiring passage 54 while the articulated display 10 is tilted vertically, tilted laterally, translated vertically, and/or rotated. The neck portion 42 of the ball joint 16 may extend through the mounting aperture 24. The neck portion 42 may frictionally interact with the compression module 18 within the mounting aperture 24. The ball joint 16 allows for the articulated display 10 to tilt and rotate about a fixed A-axis.

Referring to FIGS. 3 and 4, the lower compression module 22 defines an upper rim 56, and the upper compression module 20 defines a lower rim 58. In one embodiment, at least one of the upper rim 56 of the lower compression module 22 and the lower rim 58 of the upper compression module 20 are coupled with a compression damper 60. While the upper compression module 20 couples with the lower compression module 22, the compression damper 60 is sandwiched therebetween. Similarly, the lower compression module 22 defines a plurality of securing apertures 62 that extend from the upper rim 56 into the lower compression module 22. Typically, the upper compression module 20 defines a plurality of securing apertures 62 respective of the securing apertures 62 of the lower compression module 22. The plurality of securing apertures 62 of the upper compression module 20 extend through a top end 64 of the upper compression module 20 opposite the lower rim 58 to the lower rim 58 of the upper compression module 20.

Still referring to FIGS. 3 and 4, the lower compression module 22 also defines at least one adjuster aperture 66. The at least one adjuster aperture 66 of the upper compression module 20 is configured to receive an adjuster bolt 68 which contacts the ball joint 16 within the ball chamber 28 and applies a frictional force to the ball joint 16. The upper compression module 20 receives a plurality of fasteners 70 through the plurality of securing apertures 62. The plurality of fasteners 70 are received through the plurality of securing apertures 62 of the lower compression module 22 as well. The fasteners 70 couple the upper compression module 20 with the lower compression module 22. Additionally, or alternatively, the upper compression module 20 may couple with the lower compression module 22 via another contemplated coupling apparatus (e.g., snaps, tongue-serration devices, adhesive, and well-known or obvious coupling apparatuses).

In further reference to FIGS. 3 and 4, the lower compression module 22 is contemplated to include an inner surface 72 and an outer surface 74. The inner surface 72 of the lower compression module 22 accommodates the wire 46. The pedestal sleeve housing 30 also includes an inner surface 76 and an outer surface 78. The outer surface 74 of the lower compression module 22 faces the inner surface 76 of the pedestal sleeve housing 30. The compression module 18 at least partially extends into the interior 32 of the vehicle 34 such that the wire 46 is hidden from view (also shown in FIG. 2A).

Referring to FIG. 3, the lower compression module 22 is contemplated to include at least one protruding wing 80 that protrudes from the outer surface 74 of the lower compression module 22. The at least one protruding wing 80 extends vertically along a height of the lower compression module 22. The pedestal sleeve housing 30 is contemplated to define at least one groove 82 on the inner surface 76 of the pedestal sleeve housing 30 and that extends along a height of the pedestal sleeve housing 30. A length of the at least one protruding wing 80 is less than a length of the at least one groove 82. The pedestal sleeve housing 30 receives the at least one protruding wing 80 within the at least one groove 82. Additionally, or alternatively, the pedestal sleeve may include the at least one protruding wing 80, and the lower compression module 22 may define the at least one groove 82. The at least one protruding wing 80 applies a friction force to the other of the pedestal sleeve housing 30 and the lower compression module 22 within the at least one groove 82. The at least one protruding wing 80 slides vertically within the at least one groove 82 to slide the articulated display 10 vertically.

Referring to FIGS. 3-5, the inner surface 76 of the pedestal sleeve housing 30 at least partially circumscribes the compression module 18. The pedestal sleeve housing 30 couples with the interior 32 of the vehicle 34, which, in this example, is the dash 40 of the vehicle 34. The pedestal sleeve housing 30 defines a locking chamber 84. The locking chamber 84 is defined on the inner surface 76 of the pedestal sleeve housing 30. The pedestal sleeve housing 30 partially houses a locking apparatus 86 within the locking chamber 84. The locking apparatus 86 comprises a locking pin holder 88 and a locking pin 90. The locking pin 90 transitions from a disengaged position where the locking pin 90 travels further inside the locking pin holder 88 and toward the outer surface 78 of the pedestal sleeve housing 30 along a fixed B-axis to an engaged position where the locking pin 90 travels further outside the locking pin holder 88 away from the outer surface 78 of the pedestal sleeve housing 30 also along the fixed B-axis. The locking pin 90 can travel between disengaged and engaged positions manually, electromechanically (e.g., a solenoid), hydraulically, or via various technologies used to translate portions. The locking pin may be coupled with a motor 94. While in the engaged position, the locking pin 90 extends into the second locking aperture 26 of the compression module 18 and the first locking aperture 50 of the ball joint 16, thus the articulated display 10 remains untilted along the fixed A-axis and stationary along a C-axis. The neck portion 42 of the ball joint 16 is centered on the fixed A-axis. The first locking aperture 50 aligns with the fixed B-axis while the locking pin 90 is the engaged position. The fixed B-axis and the fixed A-axis are intersecting, thus the articulated display 10 remains unrotated while the locking pin 90 is in the engaged position. The articulated display 10 may tilt laterally, tilt vertically, rotate about the ball joint 16, and translate vertically while the locking pin 90 is in the disengaged position.

The compression module 18 defines a second chamfered rim 92 around the second locking aperture 26. The second chamfered rim 92 and the first chamfered rim 52 allow for convenient entry of the locking pin 90 through the second locking aperture 26 and through the first locking aperture 50.

According to the various aspects of the disclosure, the articulated display 10 is assembled on the vehicle 34, and comprises a display housing 12, a ball joint 16 outwardly extending from a backside of the display housing 12, wherein the ball joint 16 defines a first locking aperture 50, A compression module 18, wherein the compression module 18 defines a second locking aperture 26 and a mounting aperture 24, and wherein the ball joint 16 is disposed within the mounting aperture 24, a pedestal sleeve housing 30, wherein the compression module 18 slidably couples with the pedestal sleeve housing 30, and a locking pin 90 coupled with the pedestal sleeve housing 30.

Embodiments of these various aspects of the disclosure can include the compression module 18 comprising an upper compression module 20, and a lower compression module 22, wherein the upper compression module 20 couples with the lower compression module 22 via a plurality of fasteners 70, and wherein the upper compression module 20 and the lower compression module 22 each apply a frictional force to the ball joint 16. Embodiments also can include at least one adjuster bolt 68 that adjusts the frictional force applied to the ball joint 16 by each of the upper compression module 20 and the lower compression module 22. Embodiments also include the locking pin 90 operating between an engaged position, wherein the locking pin 90 extends through the first and second locking apertures 50, 26, and a disengaged position, wherein the locking pin 90 holds the display housing 12 in position relative to the locking pin 90 while the locking pin 90 is in the engaged position, and further wherein the articulated display 10 tilts laterally, tilts vertically, rotates about the ball joint 16, and translates vertically while the locking pin 90 is in the disengaged position. Embodiments also include the pedestal sleeve housing 30 at least partially circumscribes the compression module 18, wherein the compression module 18 defines at least one groove 82, wherein the pedestal sleeve housing 30 comprises at least one protruding wing 80, and further wherein the at least one groove 82 of the compression module 18 receives the at least one protruding wing 80 of the pedestal sleeve housing 30. Embodiments also include the at least one protruding wing 80 of the pedestal sleeve housing 30 applies a frictional force to the at least one groove 82 of the compression module 18. Embodiments also include the ball joint 16 defines a first chamfered rim 52 around the first locking aperture 50, and wherein the compression module 18 defines a second chamfered rim 92 around the second locking aperture 26. Embodiments also include the ball joint 16 further defining a wiring passage 54. Embodiments also include the pedestal sleeve housing 30 at least partially circumscribing the compression module 18. Embodiments further include the ball joint 16 comprising a neck portion 42, wherein the neck portion 42 extends through the mounting aperture 24 of the compression module 18, and a ball portion 44, wherein the ball portion 44 is encapsulated within the compression module 18.

According to additional various aspects of the disclosure, an articulated display 10 for a vehicle 34, the articulated display 10 comprises a display housing 12, a ball joint 16 outwardly extending from a backside of the display housing 12, wherein the ball joint 16 defines a first locking aperture 50, A compression module 18, wherein the compression module 18 defines a mounting aperture 24 and a second locking aperture 26, and wherein the compression module 18 comprises an upper compression module 20, wherein the upper compression module 20 defines a plurality of securing apertures 62, a plurality of fasteners 70 received by the plurality of securing apertures 62, respectively, and a lower compression module 22, wherein the ball joint 16 is held in the mounting aperture 24, and wherein the upper compression module 20 couples with the lower compression module 22 via the plurality of fasteners 70 to define a friction fit with the ball joint 16, a pedestal sleeve housing 30, wherein the pedestal sleeve housing 30 at least partially circumscribes the compression module 18, and wherein the compression module 18 is slidably coupled with the pedestal sleeve housing 30, and a locking pin 90 operates between an engaged position and a disengaged position, wherein the locking pin 90 holds the display housing 12 in position relative to the locking pin 90 while the locking pin 90 is in the engaged position and extending through the first and second locking apertures 50, 26, and further wherein the articulated display 10 tilts laterally, tilts vertically, rotates about the ball joint 16, and translates vertically while the locking pin 90 is in the disengaged position.

Embodiments of these various aspects of the disclosure include the ball joint 16 being encapsulated within the compression module 18. Embodiments also include the compression module 18 comprising at least one protruding wing 80, wherein the pedestal sleeve housing 30 defines at least one groove 82, and further wherein the at least one groove 82 of the pedestal sleeve housing 30 receives the at least one protruding wing 80 of the compression module 18. Embodiments also include the at least one protruding wing 80 of the compression module 18 applies a frictional force to the pedestal sleeve housing 30 within the at least one groove 82. Embodiments further include the ball joint 16 defining a first chamfered rim 52 around the first locking aperture 50, and wherein the compression module 18 defines a second chamfered rim 92 around the second locking aperture 26.

According to even more various aspects of the disclosure, an articulated display 10 for a vehicle 34, the articulated display 10 comprises a display housing 12, a ball joint 16 outwardly extending from a backside of the display housing 12, wherein the ball joint 16 defines a first locking aperture 50, an upper compression module 20 that defines a plurality of securing apertures 62, a lower compression module 22 operably coupled to the upper compression module 20, wherein the upper compression module 20 and the lower compression module 22 together define a second locking aperture 26, and a mounting aperture 24, wherein the ball joint 16 is held in the mounting aperture 24, and wherein the upper compression module 20 couples with the lower compression module 22 to define a friction fit with the ball joint 16, a pedestal sleeve housing 30 slidably coupled with the lower compression module 22, and a locking pin 90 coupled with the pedestal sleeve housing 30.

Embodiments of these various aspects of the disclosure include the ball joint 16 comprising a neck portion 42, wherein the neck portion 42 extends through the mounting aperture 24 of the upper compression module 20 and the lower compression module 22, and a ball portion 44, wherein the ball portion 44 is encapsulated between the upper compression module 20 and the lower compression module 22. Embodiments also include the locking pin 90 operating between an engaged position and a disengaged position, wherein the locking pin 90 holds the display housing 12 in position relative to the locking pin 90 while the locking pin 90 is in the engaged position and extending through the first and second locking apertures 50, 26, and further wherein the articulated display 10 tilts laterally, tilts vertically, rotates about the ball joint 16, and translates vertically while the locking pin 90 is in the disengaged position. Embodiments also include at least one adjuster bolt 68 to adjust the frictional force applied to the ball joint 16 by each of the upper compression module 20 and the lower compression module 22. Embodiments further include the lower compression module 22 comprises at least one protruding wing 80, wherein the pedestal sleeve housing 30 defines at least one groove 82, and further wherein the at least one groove 82 of the pedestal sleeve housing 30 receives the at least one protruding wing 80 of the lower compression module 22.

The articulated display 10 for a vehicle 34 advantageously provides for a viewable display that can be articulated to face more toward a driver, or a passenger. The articulated display 10 advantageously can be articulated to face more toward an occupant that is not driving and in a reclined position. The articulated display 10 advantageously can be articulated to rotate to provide for an infinite scroll on various applications that use portrait mode configurations and landscape mode configurations. The articulated display 10 also advantageously can be articulated to translate to provide for a convenient viewing by users of varying eye levels.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An articulated display for a vehicle, the articulated display comprising:
    a display housing;
    a ball joint outwardly extending from a backside of the display housing, wherein the ball joint defines a first locking aperture;
    a compression module, wherein the compression module defines a second locking aperture and a mounting aperture, and wherein the ball joint is disposed within the mounting aperture;
    a pedestal sleeve housing, wherein the compression module slidably couples with the pedestal sleeve housing; and
    a locking pin coupled with the pedestal sleeve housing, wherein the locking pin engages the first locking aperture and the second locking aperture in an engaged position and disengages at least the first locking aperture in a disengaged position, the locking pin engaging the second locking aperture before engaging the first locking aperture when traveling from the disengaged position to the engaged position, wherein the compression module comprises:
    an upper compression module; and
    a lower compression module, wherein the upper compression module couples with the lower compression module via a plurality of fasteners, and wherein the upper compression module and the lower compression module each apply a frictional force to the ball joint, wherein at least one adjuster bolt adjusts the frictional force applied to the ball joint by each of the upper compression module and the lower compression module.

2. The articulated display of claim 1, wherein the pedestal sleeve housing at least partially circumscribes the compression module, the compression module including at least one wing and the sleeve housing including at least one groove, wherein the at least one groove receives the at least one wing.

3. The articulated display of claim 2, wherein the at least one protruding wing applies a frictional force to the at least one groove.

4. The articulated display of claim 1, wherein the ball joint defines a first chamfered rim around the first locking aperture, and wherein the compression module defines a second chamfered rim around the second locking aperture.

5. The articulated display of claim 1, wherein the pedestal sleeve housing at least partially circumscribes the compression module.

6. The articulated display of claim 1, wherein the ball joint comprises:
   a neck portion, wherein the neck portion extends through the mounting aperture of the compression module;
   a ball portion, wherein the ball portion is encapsulated within the compression module; and
   a wiring passage comprising:
      a channel through the neck portion of the ball joint; and
      an opening in the ball portion of the ball joint.

7. An articulated display for a vehicle, the articulated display comprising:
   a display housing;
   a ball joint outwardly extending from a backside of the display housing, wherein the ball joint defines a first locking aperture;
   a compression module, wherein the compression module defines a second locking aperture and a mounting aperture, and wherein the ball joint is disposed within the mounting aperture;
   a pedestal sleeve housing, wherein the compression module slidably couples with the pedestal sleeve housing; and
   a locking pin coupled with the pedestal sleeve housing, wherein the locking pin engages the first locking aperture and the second locking aperture in an engaged position and disengages at least the first locking aperture in a disengaged position, the locking pin engaging the second locking aperture before engaging the first locking aperture when traveling from the disengaged position to the engaged position, wherein the locking pin operates between:
      the engaged position, wherein the locking pin extends through the first and second locking apertures, and wherein the locking pin holds the display housing in a locked position relative to the locking pin while the locking pin is in the engaged position; and
      the disengaged position, wherein the articulated display is configured to tilt laterally, tilt vertically, rotate about the ball joint, and translate vertically while the locking pin is in the disengaged position.

8. An articulated display for a vehicle, the articulated display comprising:
   a display housing;
   a ball joint outwardly extending from a backside of the display housing, wherein the ball joint defines a first locking aperture;
   an upper compression module that defines a plurality of fastener apertures;
   a lower compression module operably coupled to the upper compression module, wherein the upper compression module and the lower compression module together define:
      a compression axis along which the upper compression module and the lower compression module are coupled;
      a second locking aperture; and
      a mounting aperture, wherein the ball joint is held in the mounting aperture, and wherein the upper compression module couples with the lower compression module to define a friction fit with the ball joint;
   a pedestal sleeve housing slidably coupled with the lower compression module; and
   a locking pin coupled with the pedestal sleeve housing.

9. The articulated display of claim 8, wherein the ball joint comprises:
   a neck portion, wherein the neck portion extends through the mounting aperture of the upper compression module and the lower compression module; and
   a ball portion, wherein the ball portion is encapsulated between the upper compression module and the lower compression module.

10. The articulated display of claim 8, wherein the locking pin operates between an engaged position and a disengaged position, wherein the locking pin holds the display housing in position relative to the locking pin while the locking pin is in the engaged position and extending through the first and second locking apertures, and further wherein the articulated display is configured to tilt laterally, tilt vertically, rotate about the ball joint, and translate vertically while the locking pin is in the disengaged position.

11. The articulated display of claim 8, wherein at least one adjuster bolt adjusts the frictional force applied to the ball joint by each of the upper compression module and the lower compression module.

12. The articulated display of claim 8, wherein the lower compression module comprises at least one protruding wing, wherein the pedestal sleeve housing defines at least one groove, and further wherein the at least one groove of the pedestal sleeve housing receives the at least one protruding wing of the lower compression module.

13. The articulated display of claim 9, wherein the ball joint further comprises:
   a channel through the neck portion of the ball joint; and
   an opening in the ball portion of the ball joint, wherein a wire passes through the neck portion and the ball portion of the ball joint.

* * * * *